United States Patent
Spreadbury et al.

(10) Patent No.: US 12,077,289 B2
(45) Date of Patent: Sep. 3, 2024

(54) AIRCRAFT ASSEMBLY HAVING AN INTEGRAL SPAR-COVER

(71) Applicant: AIRBUS OPERATIONS LIMITED, Bristol (GB)

(72) Inventors: Robert Charles Spreadbury, Bristol (GB); Richard Hipkiss, Bristol (GB); Janusz Walega, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 205 days.

(21) Appl. No.: 17/426,494

(22) PCT Filed: May 28, 2020

(86) PCT No.: PCT/EP2020/064796
§ 371 (c)(1),
(2) Date: Jul. 28, 2021

(87) PCT Pub. No.: WO2020/239888
PCT Pub. Date: Dec. 3, 2020

(65) Prior Publication Data
US 2022/0097820 A1    Mar. 31, 2022

(30) Foreign Application Priority Data

May 31, 2019 (GB) ...................................... 1907797

(51) Int. Cl.
*B64C 3/20* (2006.01)
*B64C 3/18* (2006.01)
(Continued)

(52) U.S. Cl.
CPC ................ *B64C 3/20* (2013.01); *B64C 3/185* (2013.01); *B64C 3/187* (2013.01); *B64C 3/26* (2013.01); *B64F 5/10* (2017.01)

(58) Field of Classification Search
CPC .. B64C 3/20; B64C 3/26; B64C 3/182; B64C 3/185; B64C 1/064; B64C 1/065
See application file for complete search history.

(56) References Cited

U.S. PATENT DOCUMENTS 2,496,024 A    1/1950 Schwendler et al.
3,780,969 A    12/1973 Nussbaum et al.
(Continued)

FOREIGN PATENT DOCUMENTS

EP    2 492 086    8/2012
EP    3254950      12/2017
(Continued)

OTHER PUBLICATIONS

International Search Report for PCT/EP2020/064796, mailed Sep. 21, 2020, 4 pages.
(Continued)

*Primary Examiner* — Timothy D Collins
*Assistant Examiner* — Eric Acosta
(74) *Attorney, Agent, or Firm* — Nixon & Vanderhye P.C.

(57) ABSTRACT

An aircraft assembly is disclosed including a longitudinal spar and an aerofoil cover integrally formed from a composite laminate material to form a spar-cover such that the composite material of the spar extends continuously into the cover through a fold region created between the spar and the cover. The spar and cover are separated by a recess at a longitudinal end of the fold region to define a spar end region and a cover end region, and a reinforcement element extends between the spar end region and the cover end region to couple the spar end region with the cover end region.

15 Claims, 6 Drawing Sheets

(51) Int. Cl.
*B64C 3/26* (2006.01)
*B64F 5/10* (2017.01)

(56) References Cited

U.S. PATENT DOCUMENTS

| | | | |
|---|---|---|---|
| 4,437,426 A | 3/1984 | Latham | |
| 2016/0176499 A1* | 6/2016 | Evans | B64C 3/26 244/123.1 |
| 2018/0155004 A1 | 6/2018 | Woolcock | |

FOREIGN PATENT DOCUMENTS

| | | | | |
|---|---|---|---|---|
| EP | 3254950 A1 * | 12/2017 | | B29C 70/30 |
| EP | 3287362 | 2/2018 | | |
| GB | 2552216 A * | 1/2018 | | B64C 1/064 |
| GB | 2557274 | 6/2018 | | |

OTHER PUBLICATIONS

Written Opinion of the ISA for PCT/EP2020/064796, mailed Sep. 21, 2020, 6 pages.
Combined Search and Examination Report for GB1907797.3, dated Nov. 13, 2019, 5 pages.

* cited by examiner

AIRCRAFT ASSEMBLY HAVING AN INTEGRAL SPAR-COVER

CROSS REFERENCE TO RELATED APPLICATIONS

The present application is a National Phase of International Application Number PCT/EP2020/064796 filed May 28, 2020, which designated the U.S. and claims priority benefits from Great Britain Application Number GB 1907797.3 filed May 31, 2019, the entire contents of each of which are hereby incorporated by reference.

FIELD OF THE INVENTION

The present invention relates to an aircraft assembly having an integral spar-cover, an aircraft comprising the aircraft assembly, and a method of assembling an aircraft assembly.

BACKGROUND OF THE INVENTION

Integration of the spar and cover panel of a wing box into a single component provides a number of benefits compared with a conventional aerofoil body that has separately manufactured spars and covers which are assembled together, such as a reduced parts count, reduced assembly time and increased mechanical performance.

The assembly of the wing box is typically undertaken using the lower inboard end of the wing as a datum, such that strict manufacturing tolerances are required in order to ensure the close fitting of components at the outboard end of the wing. Due to the extensive length of most commercial aircraft wings this can be particularly challenging, and can be even more challenging when the wing box includes composite material components that are susceptible to manufacturing variabilities during and after the cure-process. As a result, the tooling needs to be accurate in order to maintain control of the tolerances further from the datum point.

SUMMARY OF THE INVENTION

A first aspect of the invention provides an aircraft assembly comprising: a longitudinal spar and an aerofoil cover, the spar and cover being integrally formed from a composite laminate material to form a spar-cover such that the composite material of the spar extends continuously into the cover through a fold region created between the spar and the cover, the spar having a spar end region and the cover having a cover end region separated by a recess at a longitudinal end of the fold region, and wherein a reinforcement element extends between the spar end region and the cover end region to couple the spar end region with the cover end region.

The recess provides additional flexibility to the end regions by decoupling the cover and spar along a portion of the length of the spar-cover, allowing the end regions to flex relative to each other and the remaining sections of the spar-cover, and therefore facilitates them to be deflected and thereby more easily aligned with the structural member. The recess allows the spar to deflect in two orthogonal directions. The two orthogonal directions are perpendicular to the axis of the fold region. As a result, the need for time consuming and costly shimming operations is reduced or eliminated, as is the requirement for expensive thickness control measures. The recess is a discontinuity in the shear continuity between the spar and cover of the spar-cover. The discontinuity is reinforced by a reinforcement element that re-introduces the shear continuity between the spar and cover at the spanwise location of the recess, in order to restore/repair any loss of load-carrying ability due to the inclusion of the recess.

A further aspect of the invention provides an aircraft comprising the aircraft assembly of the first aspect.

Another aspect of the invention provides a method of assembling an aircraft assembly, the aircraft assembly comprising: a structural member, a longitudinal spar, and an aerofoil cover, the spar and cover being integrally formed from a composite laminate material to form a spar-cover such that the composite material of the spar extends continuously into the cover through a fold region created between the spar and the cover, the method comprising: forming a recess in the fold region to separate the spar and cover at a longitudinal end of the integrally formed spar-cover, attaching the spar end region to the structural member, attaching the cover end region to the structural member, and coupling the cover end region to the spar end region with a reinforcement element.

Another aspect of the invention provides an aerofoil shaped body comprising: a first aerofoil cover; and an integrally formed spar-cover formed from a composite laminate material having a longitudinal spar, a second aerofoil cover, and a fold region created between the spar and the second aerofoil cover to extend continuously between the spar and the second aerofoil cover; wherein a portion of the second aerofoil cover at one end of the spar-cover is separated from the spar and is in at least one of a deflected position towards and a deflected position away from the first aerofoil cover with respect to the remainder of the second aerofoil cover; the body further comprising a bridging member between the portion of the second aerofoil cover and the spar arranged to hold the portion of the second aerofoil cover in the deflected position.

The aircraft assembly may be an aerofoil shaped body, such as a wing, horizontal tail plane or vertical tail plane. An aerofoil shaped body is a three dimensional body having an aerofoil cross-section (2-D), and is otherwise known as a 3-D aerofoil. Aerofoil bodies, such as wings, typically include a torsion box comprising upper and lower covers (or skins) on either side of a frame comprising spanwise spars and chordwise ribs. At least one spar is provided for each wing, although two or more is more common. In an aircraft wing, the torsion box is otherwise known as a wing box. The covers may also be reinforced with stringers, extending generally spanwise.

The integral spar-cover is a monolithic spar-cover, such that the composite laminate material of the spar extends continuously into the cover panel. The spar and cover are not manufactured as separate components that are then joined together, but are manufactured as one component, with the composite laminate material of the spar extending continuously into the cover without a break. However it should be noted that since the composite laminate material will include several plies, not all plies are required to extend from the spar into the cover and vice versa. It is sufficient that at least some plies, or composite fibres, extend from the spar into the cover through the fold region.

Reference to the fold region refers to an angle or out-of-plane curvature formed between the spar and cover. The fold region may be a sharp vertex or a smoothly blended arcuate corner.

Reference to longitudinal spar refers to a spar running along the length of the wing in a substantially spanwise direction from the wing root to the wing tip. The longitudinal spar may be substantially perpendicular to the longitudinal axis of the fuselage, although may be slightly inclined to the fuselage longitudinal axis due to, for example, the aspect ratio, twist or sweep of the wing.

The aerofoil cover may be an upper aerofoil cover and the aircraft assembly may comprise a lower aerofoil cover and a structural member, the structural member extending between the cover end region of the upper cover and the lower cover.

The cover end region may be held in a deflected position to fix the structural member between the cover end region of the upper cover and the lower cover. The spar end region may be held in a deflected position. With this arrangement, any tolerance variations in the spar-cover or structural member can be accommodated during assembly.

Reference to the deflected position refers to, for example, the cover end region being deflected relative to the spar-cover inboard of the juncture and/or the spar end region, or alternatively the spar end region being deflected relative to the spar-cover inboard of the juncture and/or the cover end region.

The structural member may be a rib at an outboard end of the aircraft assembly. This is advantageous, as the inboard end of the wing is typically used as a datum point, causing any tolerance variations to be exacerbated further outboard of the wing. These tolerance variations can be compensated for by decoupling the integrated spar and cover over a discrete length at the outboard end.

The aircraft assembly may be a wing assembly and the structural member may be arranged to mount a winglet.

The spar-cover may have a first limb corresponding to the upper cover, a second limb corresponding to a spar web, and a third limb corresponding to a spar flange for attachment to the lower cover.

The reinforcement element may abut the structural member. The reinforcement element may overlap the structural member. The reinforcement element may be coupled to the structural member.

The fold region may have a curved fold axis extending substantially in the longitudinal direction of the spar, and the recess may extend in the direction of the curved fold axis.

The reinforcement element may hold at least one of the spar end region and the cover end region in a deflected position. The spar may comprise a spar web and a spar flange, and the reinforcement element may hold at least one of the spar web and spar flange in a deflected position.

The reinforcement element may overlap a juncture between the longitudinal end of the fold region and the recess. Reinforcing at the juncture with the reinforcing element helps to control the strains in the recess at this stress concentration zone, maintaining the juncture dimensions, as well as preventing crack propagation and unfolding at the recess.

The juncture may be arcuate. With this arrangement, the peak stresses at the juncture are reduced.

The reinforcement element may comprise a metal. The reinforcement element may comprise a composite material.

The spar may be a first spar and the aircraft assembly may comprise a second spar, the second spar and cover being integrally formed from a composite laminate material such that the composite material of the second spar extends continuously into the cover through a second fold region created between the second spar and the cover, wherein a second spar end region of the second spar and a cover end region of the cover are separated by a second recess at a longitudinal end of the second fold region, and wherein a second reinforcement element extends between the second spar end region and the cover end region to couple the second spar end region with the cover end region.

The method of assembling an aircraft assembly may further comprise aligning the spar end region with a lower end of the structural member and bending the cover end region to a deflected position to align with an upper end of the structural member.

Reference to terms such as upper, lower, leading edge, and trailing edge are used in reference to conventional terminology of aircraft. For instance, upper cover refers to the cover on the side of the wing in which the lift component is directed.

The terms cover, panel and cover panel are used interchangeably.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
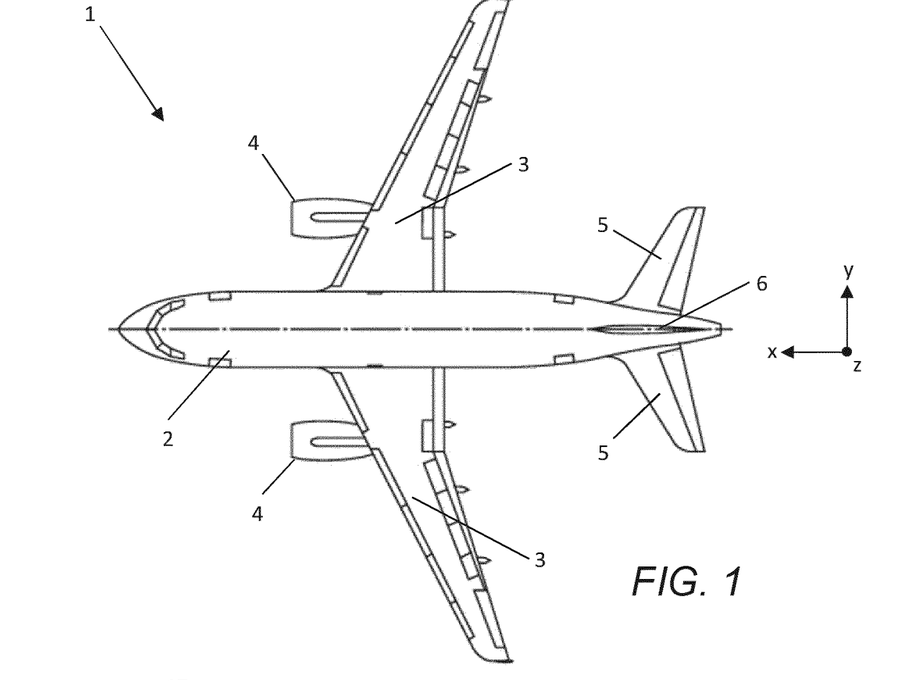
FIG. 1 illustrates a plan view of a fixed wing aircraft.

FIG. 1 illustrates a typical configuration for a fixed wing passenger transonic jet transport aircraft 1. The aircraft 1 comprises a fuselage 2, wings 3, main engines 4, horizontal tail planes 5, and vertical tail planes 6. It will be appreciated that this invention is applicable to a wide variety of aircraft types not just that illustrated in FIG. 1. For example, the aircraft may be for commercial or military purposes, may be for transporting passengers or cargo, may have jets, propeller or other engine propulsion systems, may have a variety of fuselage/wing configurations, for example a high wing, low wing or blended wing body, and may be designed to fly at subsonic, transonic or supersonic speeds.

Figure 2:
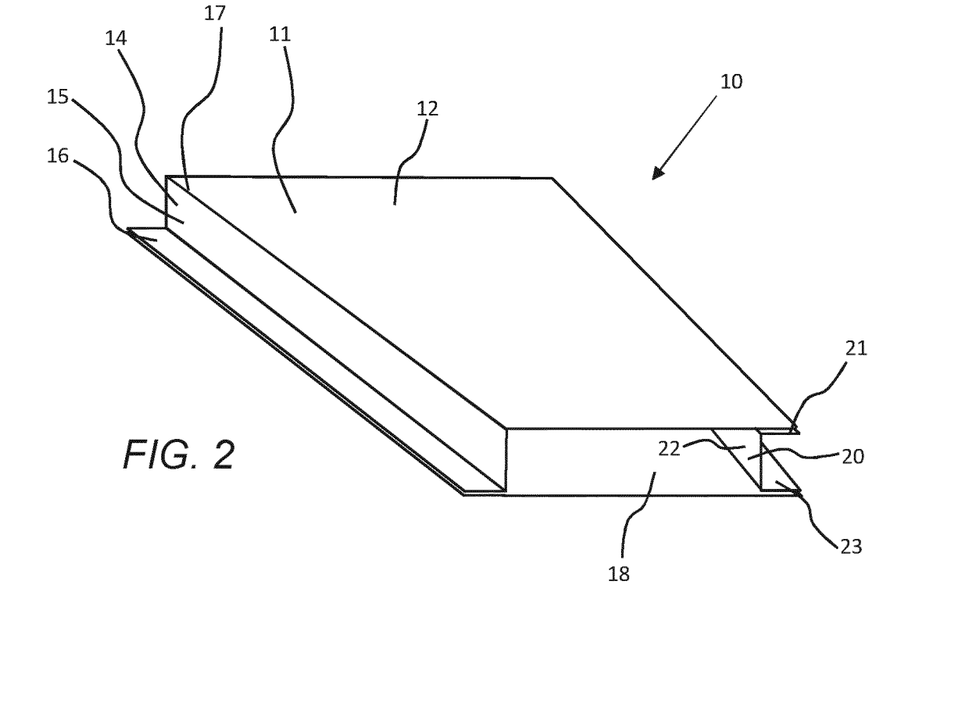
FIG. 2 illustrates a perspective view of a wing box of the port side wing.

FIG. 2 illustrates a schematic view of the wing box 10 of the port side wing 3 of the aircraft 1. The starboard and port wings 3 of the aircraft 1 are substantially identical, and so only the port wing 3 will be described in detail. As shown in FIG. 1, the wing 3 is tapered from the inboard root end of the wing 3 to the outboard tip end of the wing 3 such that the chord length of the wing 3 decreases from the inboard end to the outboard end. Correspondingly, the wing box 10 is also tapered. The wing box 10 is a support structure arranged to support a significant proportion of the loads on the wing 3. The wing box 10 has an integrated spar-cover 11, the spar-cover 11 being integrally formed from an upper cover 12 and a leading edge spar 14. The spar-cover 11 extends substantially the entire length of wing 3, from the wing root to the wing tip.

The spar-cover 11 is a monolithic structure, having a fold axis between the upper cover 12 and leading edge spar 14 such that the material of the spar 14 extends continuously into the upper cover 12 through a fold region 17. The fold region 17 extends substantially in the longitudinal direction of the spar-cover 11.

The leading edge spar 14 is a longitudinal spar extending in the spanwise direction of the wing 3, and includes a spar web 15 and a spar flange 16. As can be seen, the integrated spar-cover 11 is substantially Z-shaped, wherein the first limb corresponds to the upper cover 12, the second limb corresponds to the spar web 15, and the third limb corresponds to the spar flange 16. The spar flange 16 of the leading edge spar 14 is attached to a lower cover 18.

At the trailing edge, a trailing edge spar 20 extends between the upper and lower cover panels 12, 18. The trailing edge spar 20 is substantially C-shaped, wherein the first limb corresponds to an upper attachment flange 21 that attaches to the upper cover panel 12, the second limb corresponds to a spar web 22, and the third limb corresponds to a lower attachment flange 23 that attaches to the lower cover panel 18. The arrangement of the trailing edge spar 20 may differ. For example, the trailing edge spar 20 in some examples is integrated with one of the upper and lower covers 12, 18.

The upper cover panel 12 and lower cover panel 18 have outer aerodynamic surfaces. The wing 3 also includes a leading edge structure (not shown) and a trailing edge structure (not shown) that are aerodynamically shaped to combine with the wing box 10 to form an aerofoil shaped body.

The covers 12, 18 may be reinforced with stringers. Stringers are spanwise extending reinforcing members attached to the inside of the covers 12, 18. The wing box 10 of the wing 3 will also typically include a plurality of chordwise ribs extending between the spars 14, 20 and between the covers 12, 18. The stringers and ribs are of a conventional type and so will not be described in further detail.

Figure 3:
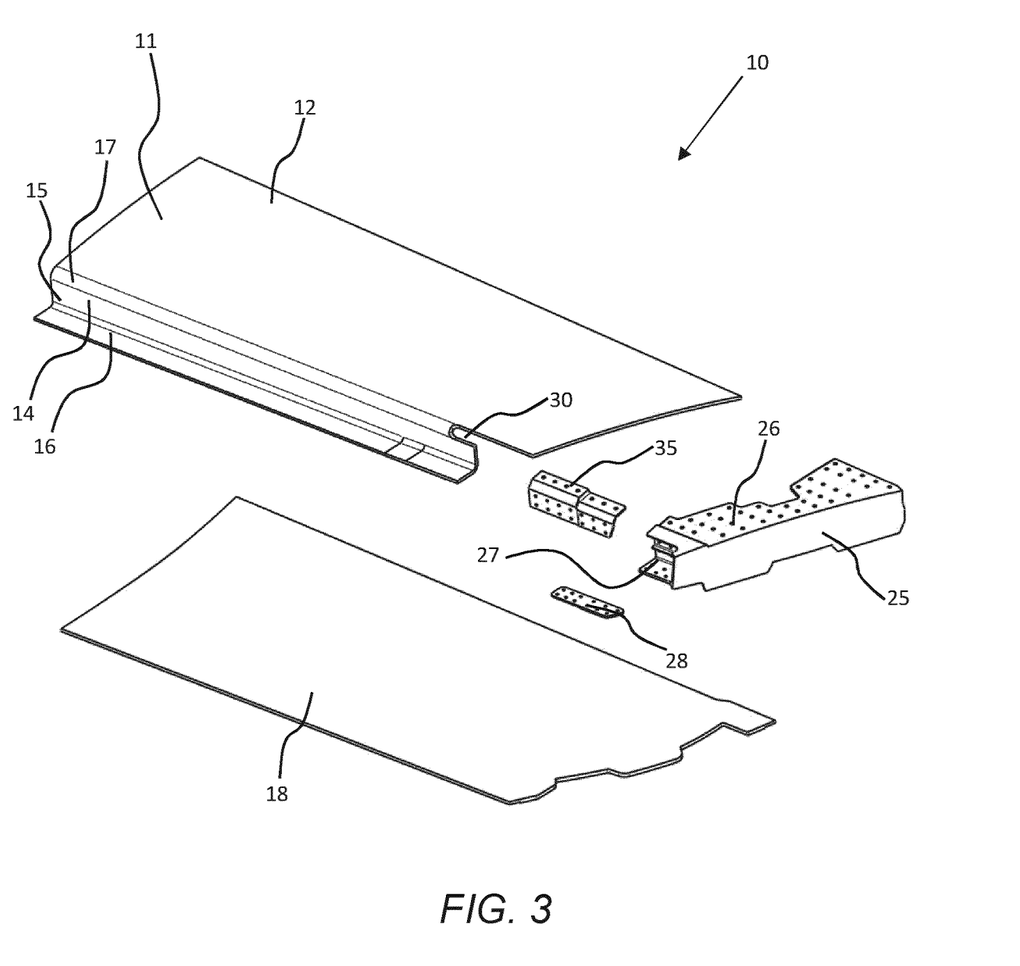
FIG. 3 illustrates an exploded perspective view of the wing box attached to an end rib.

In FIG. 3, an exploded view of the wing box 10 is shown (note that FIG. 3 does not show the trailing edge spar 20) in which the wing box 10 includes an outboard end rib 25 located at the outboard end of the wing 3. The rib is a metal rib, although the skilled person will realise that the rib could be made of other materials known in the art, such as a composite material. The outboard rib 25 includes an attachment portion (not shown) that attaches to a wing tip device (not shown).

The assembly includes a recess 30 at a longitudinal end of the fold region 17 of the integrated spar-cover 11 that separates a portion of the cover 12 and the spar 14. The recess 30 extends in the direction of the curved fold axis between the cover 12 and spar 14. A reinforcement element 35 extends between the cover 12 and the spar 14 across the recess 30 to reinforce the recess. The reinforcement element 35 is attached to the end rib 25.

The assembly also includes an attachment bracket 28 that spans across the spar-flange 16 and lower attachment portion 27 of the end-rib 25, as will be explained in further detail with reference to FIG. 6.

The wing box 10 assembly involves attaching the spar-cover 11 to the end rib 25 by attaching the upper cover 12 of the spar-cover 11 to a corresponding upper attachment portion 26 of the end rib 25, and attaching the flange 16 of the leading edge spar 14 to a corresponding lower attachment portion 27 of the end rib 25.

The design and assembly of the wings 3 is typically undertaken by using the inboard end of the wing 3 and the lower cover 18 of the wing box 10 as a datum. As a result, any variations in the tolerances of the wing box 10 dimensions are exacerbated at the outboard end of the wing 3 towards the connection of the wing box 10 with the end rib 25. Consequently, tolerance control in the sizes of the spar-cover 11, particularly the height of the spar-web 15, needs to be carefully maintained in order that the upper cover 12 aligns well with the upper attachment portion 26 of the end rib 25.

The spar-cover 11 comprises composite material, such as carbon fibre reinforced polymer. It is desirable to make the spar-cover 11 continuous along its length, without any discontinuity in the structure, so that the load path of the stresses in the wings 3 is relatively uninterrupted. However, tolerance control of composite material parts can be particularly challenging due to the reliance on accurate tooling, and the increased costs of that tooling as the part size increases, as well as the need to manage and control shrinkage of the composite parts during and after the cure process. In addition, the out-of-plane curvature of the spar-cover 11, in this case Z-shaped, makes the spar-cover 11 relatively inflexible and not tolerant to geometrical inaccuracies during assembly. As a result, it is particularly important to control and/or mitigate the tolerances of the spar-cover 11.

Figure 4:
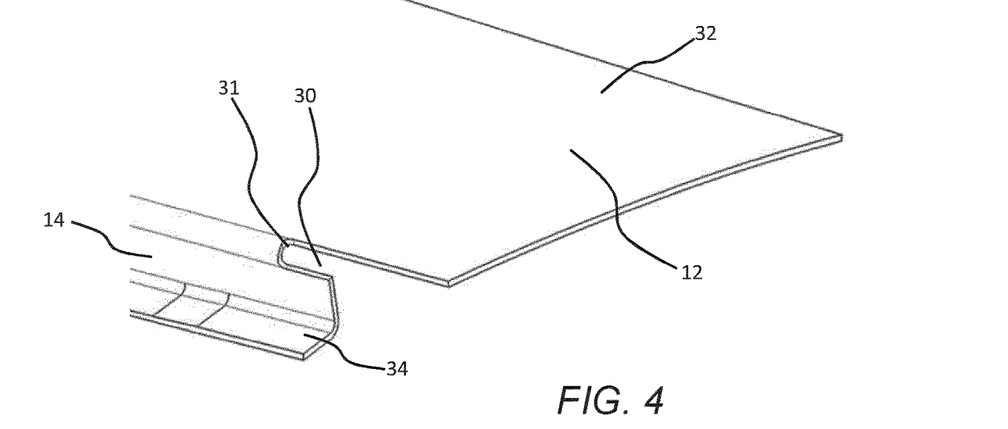
FIG. 4 illustrates the outboard end of the integrated spar-cover of the wing box.
Figure 5:
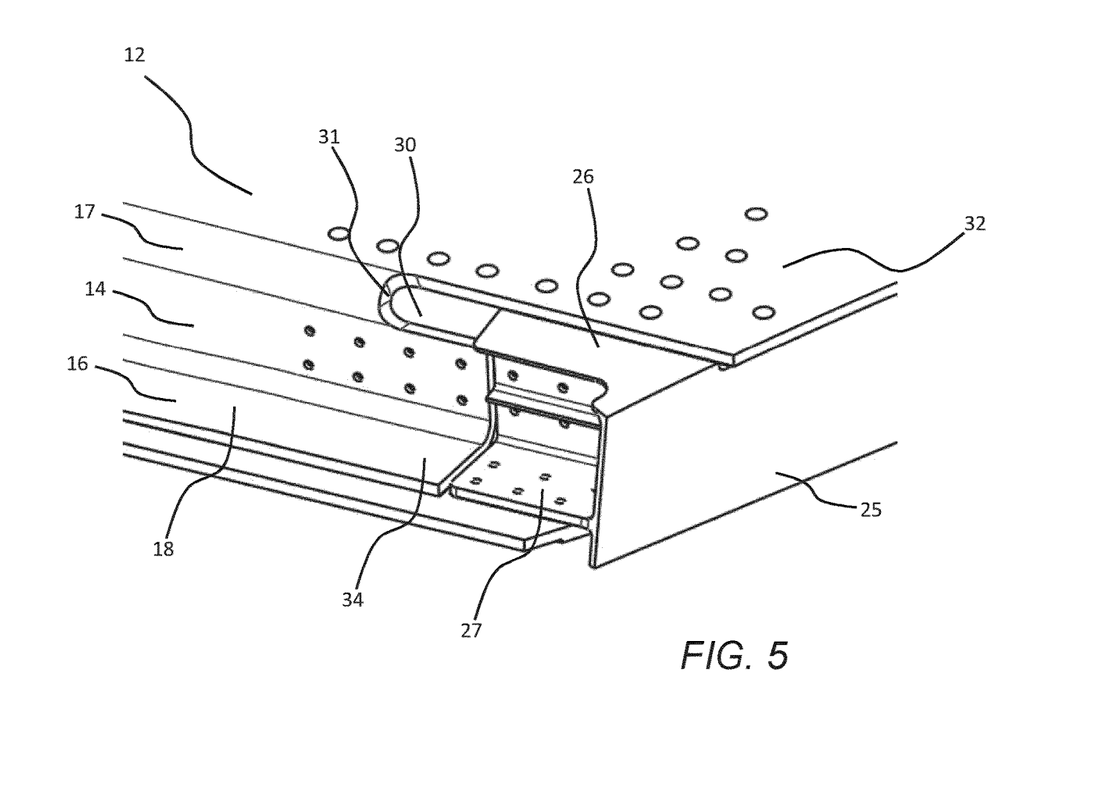
FIG. 5 illustrates the attachment between the spar-cover and end rib.

It has been found that increased tolerance control can be offset by decoupling the spar 14 and cover 12 of the integral spar-cover 11 over a discrete section in the longitudinal spanwise direction. To accommodate this, a recess 30 is formed in the fold region 17 between the spar 14 and cover 12, to form a spar end region 34 and a cover end region 32 separated by the recess 30, as shown in more detail in FIG. 4. The recess 30 is located at a longitudinal end of the fold region 17 on the integrated spar-cover 11 adjacent to the attachment location of the end rib 25, as shown in FIG. 5. The recess 30 extends in the direction of the curved fold axis between the cover 12 and spar 14, i.e. substantially in the spanwise direction of the wing 3. A juncture 31 exists between the recess 30 and the longitudinal end of the fold region 17. The juncture 31 is arcuate such that the recess 30 has a curved interface with the fold region 17. Although the juncture may have other shapes, for example the juncture 31 may be stepped and/or tapered.

The recess 30 provides additional flexibility to the end regions 32, 34 by decoupling the cover 12 and spar 14 along a portion of the length of the spar-cover 11, allowing the end regions 32, 34 some flexibility relative to each other and the remaining sections of the spar-cover 11, and therefore facilitates them to be deflected and thereby aligned with the attachment portions 26, 27 of the end rib 25. The recess 30 allows the spar 14 to deflect in the vertical and chordwise directions, thereby assisting in the alignment of the spar-cover 11 with the end rib 25.

Decoupling of the cover 12 and spar 14 of the integral spar-cover 11 reduces or eliminates the need for time consuming and costly shimming operations at the interfaces between the spar-cover 11, end rib 25, and lower cover 18. The decoupling resulting from the recess 30 also reduces the requirement for expensive thickness control measures being built into the spar-cover manufacturing process.

Figure 6:
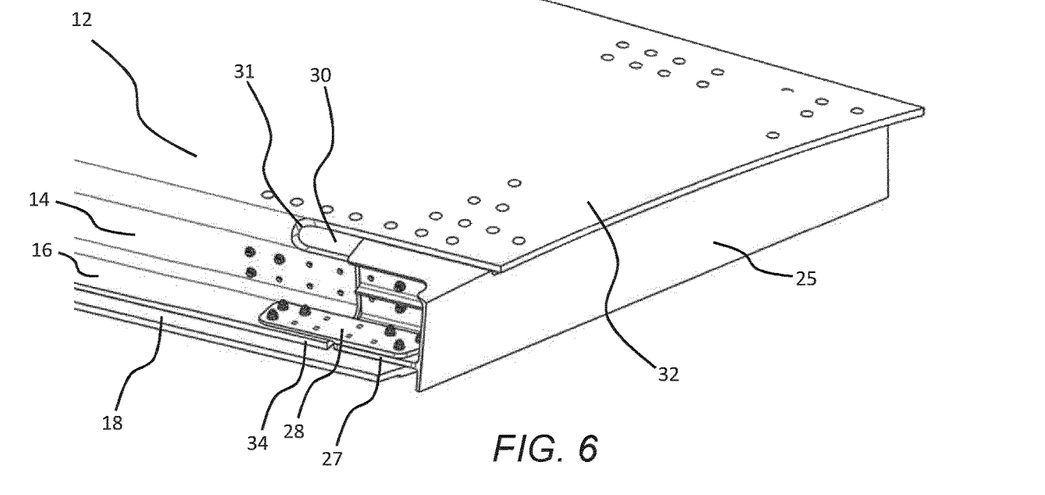
FIGS. 6 and 7 illustrate the attachment between the spar-cover and end rib coupled by an attachment bracket.
Figure 7:
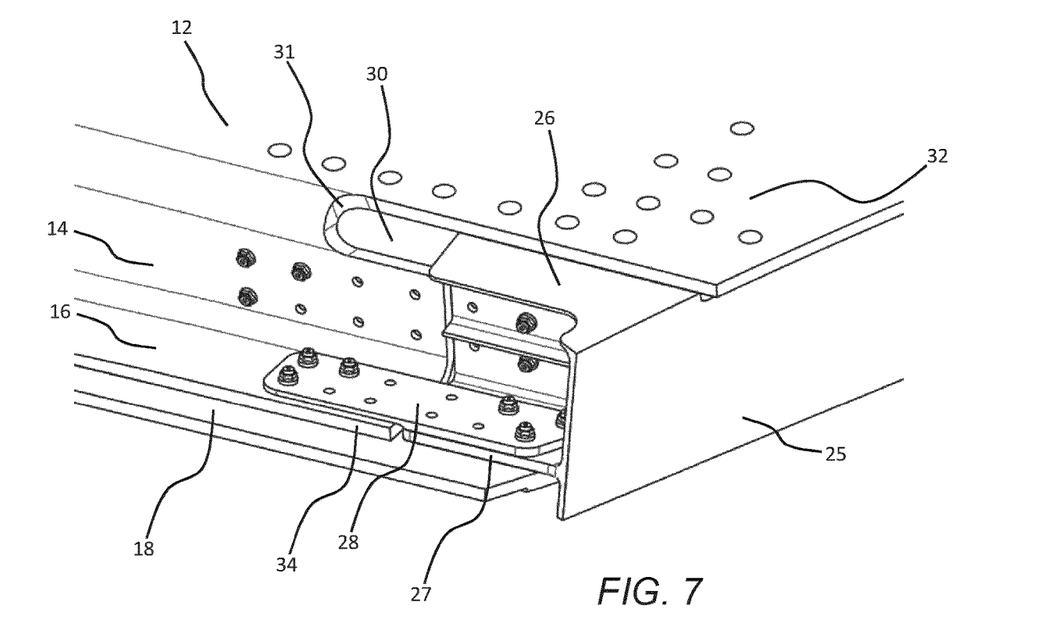

The assembly of the wing box 10 to the end rib 25 is shown in FIGS. 5 to 7. The wing box 10 is assembled by aligning the spar-flange 16 with the lower attachment portion 27 of the end rib 25, for example by taking a plane of the lower cover 18 as a datum from which to build up from. The cover end region 32 is then bent into a deflected position with respect to the spar end region 34 and inboard sections of the spar-cover 11 in order to align the cover end region 32 with an upper end of the end rib 25, such as the upper attachment portion 26. The spar end region 34 is attached to the end rib 25 using the attachment bracket 28 shown in FIG. 6, which spans between the spar end region 34 and a lower attachment portion 27 of the end rib 25. In this example, shown more closely in FIG. 7, the attachment bracket 28 varies in thickness along its extent, such that the portion abutting the end rib 25 is thicker than the portion abutting the leading edge spar 14, so as to align the flange 16 of the leading edge spar 14 to the lower attachment portion 27 of the end rib 25. The dimensions of the attachment bracket 28 may be tailored to the particular requirements of the individual wing box 10 being assembled, i.e. matched machining, and may or may not vary in thickness. In alternative examples, the flange 16 of the leading edge spar 14 may be attached directly to the lower attachment portion 27 of the end rib 25, without the use of an attachment bracket. The cover 12 may be attached indirectly to the end rib 25 using an attachment bracket 28. In further alternative examples, the spar-web 15 may attach to a corresponding attachment portion of the end rib 25 in addition or instead of the aforementioned attachment between the spar-cover 11 and end rib 25. The cover end region 32 is attached to the upper attachment portion 26 of the end rib 25.

Fasteners 40 can be used to couple the components together, some of which are shown in FIGS. 6 and 7. Other fastening means, such as adhesive, may be used in conjunction or as an alternative.

By providing compliance of the spar end region 34 and cover end region 32, gaps formed during the assembly of the components can be reduced without the need for shimming, or similar post-production operations.

The decoupling of the cover 12 and spar 14 assists in aligning the horizontally inclined spar-flange 16 and upper cover 12, in order that they can be attached to the end rib 25, by making use of the vertical compliance of the spar end region 34 and cover end region 32 relative to the spar-cover 11 region inboard of the juncture. The spar-web 15 may also be attached to the end rib 25, and in this case the assembly process makes use of the fore-aft compliance available to the spar end region 34 relative to the spar-cover 11 region inboard of the juncture.

Figure 8:
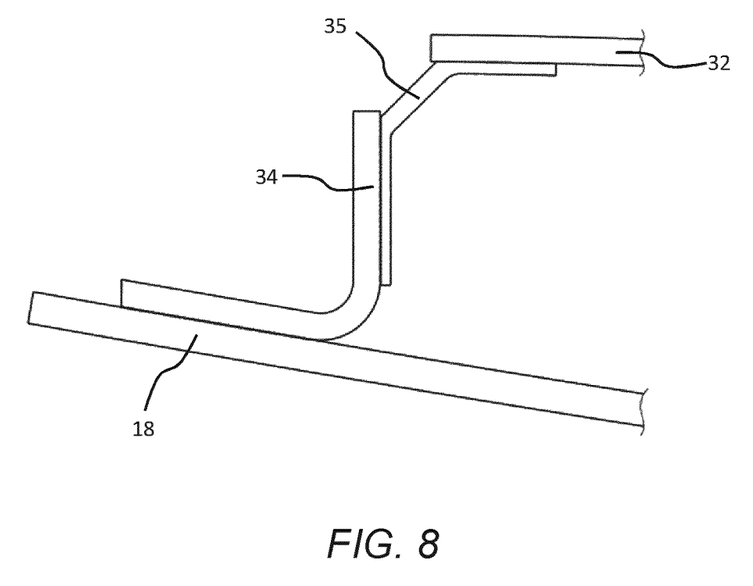
FIG. 8 illustrates a cross-sectional view of the spar end region and cover end region coupled by a reinforcement element.
Figure 9:
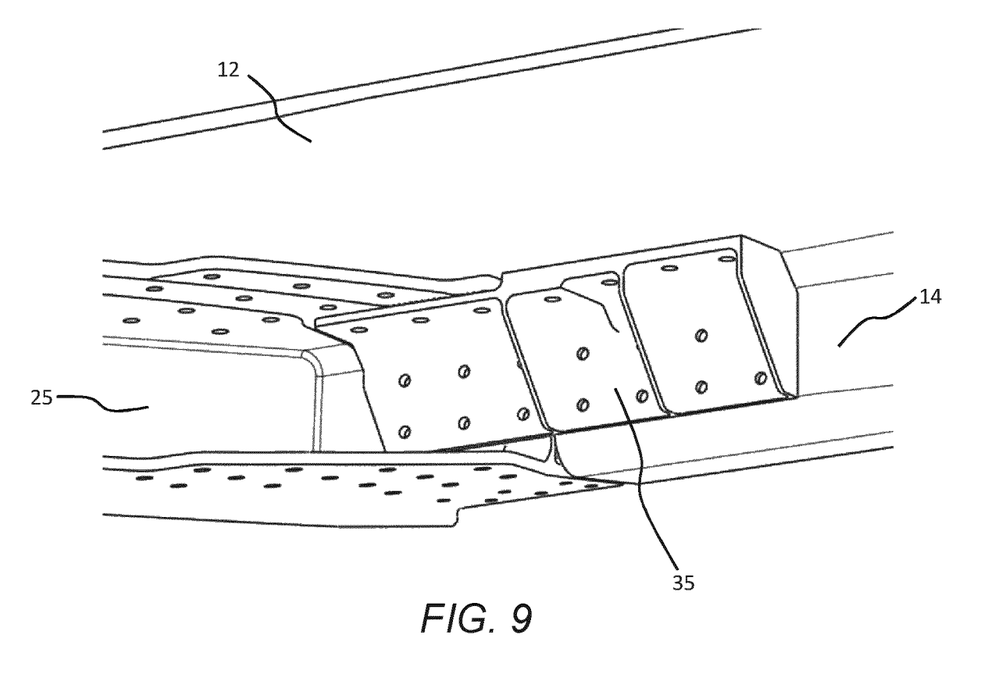
FIG. 9 illustrates a perspective view of the reinforcement element within the wing box.

The recess 30 creates a discontinuity in the composite spar-cover 11. FIGS. 8 and 9 show that the recess 30 is reinforced with a reinforcement element 35 that extends between the cover end region 32 and the spar end region 34 to couple the spar end region 34 with the cover end region 32. The reinforcement element 35 bridges between the cover end region 32 and spar end region 34, and may be referred to as a bridging member. The reinforcement element 35 is located on the inner side of the fold region 17, although in other examples it may be on the outside of the fold region 17.

The reinforcement element 35 overlaps the juncture 31 between the longitudinal end of the fold region 17 and the recess 30. The reinforcement element 35 extends from a location inboard of the juncture 31 and extends outboard to abut the end rib 25. The reinforcement element 35 helps to restore the shear continuity between the spar-web 15 and cover 12 of the spar-cover 11. The reinforcement element 35 attaches to the end rib 25 with a plurality of fasteners to form a vertical shear joint between the spar-web 15 and end rib 25 and a horizontal shear joint between the upper cover 12 and the end rib 25. The reinforcement element 35 reinforces the juncture region 31 in order to control the composite strains in the recess 30, maintain the juncture dimensions (e.g. radius) and prevent unfolding at the recess 30 (particularly at the juncture 31).

The recess 30 is a discrete recess 30, such that the cover 12 and spar 14 are integral components. For example, the recess 30 may extend up to 0.5%, 1%, 2%, 5%, 10% or 20% of the total length of the spar-cover 11. The recess 30 is a cutaway. The recess 30 is a discontinuity between the cover 12 and spar 14.

Figure 10:
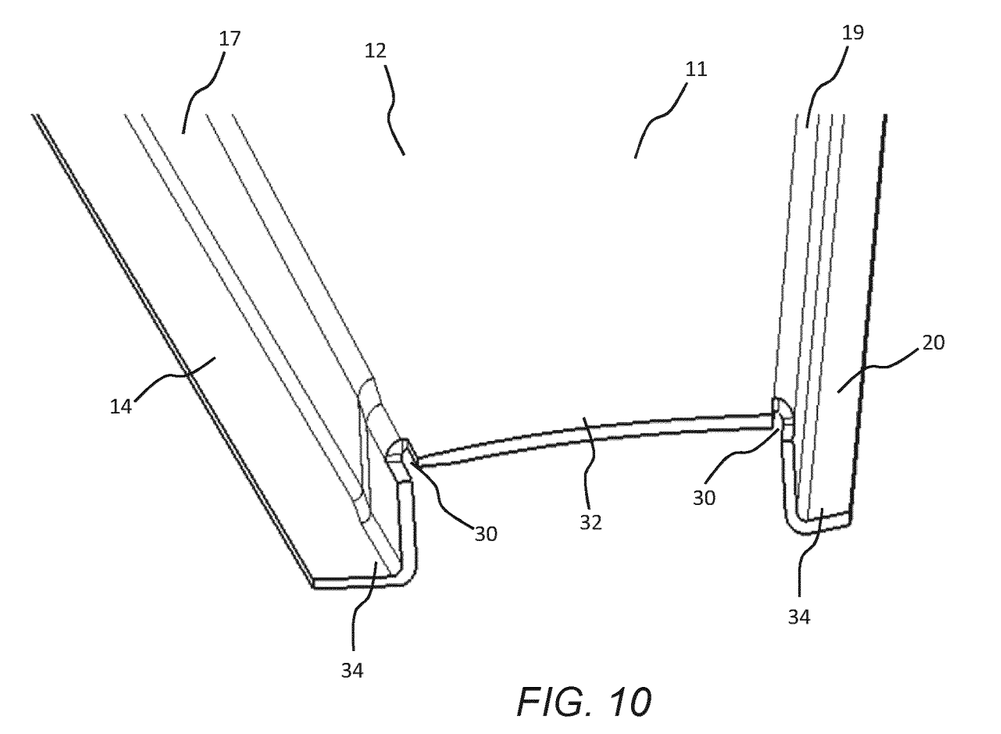
FIG. 10 illustrates an omega-shaped integrated spar-cover.

FIG. 10 shows a further example in which the integrated spar-cover is substantially Omega-shaped (alternatively referred to as U-shaped) due to the trailing edge spar 20 being integrally formed with the cover panel 12 through a second fold region 19 created between the trailing edge spar 20 and the upper cover 12 such that the material of the leading edge spar 14 extends continuously into the upper cover 12 through the first fold region 17 and continues to extend into the trailing edge spar 20 through the second fold region 19. The first and second fold regions 17, 19 extend substantially in the longitudinal spanwise direction of the wing 3.

As with the Z-shaped spar-cover, the integrated spars 14, 20 are decoupled from the upper cover panel 12 by first and second recesses 30, to form spar end regions 34 and a cover end region 32 separated by the recess 30. The recesses 30 are located at a longitudinal end of the fold regions 17, 19 on the integrated spar-cover 11 adjacent to the position the end rib 25 is attached.

The recesses 30 provide additional flexibility to the end regions 32, 34 by decoupling the cover 12 from the leading edge spar 14 and trailing edge spar 20 along a portion of the length of the spar-cover 11, allowing the end regions 32, 34 some flexibility relative to each other and the remaining sections of the spar-cover 11.

The relative flexibility of the end regions 32, 34 of the spar-cover 11 may have advantages in terms of reparability. For example, a new component introduced to replace a damaged component, such as an end rib, may be sized differently due to tolerancing or other factors. In this case, the decoupling of the spar and cover allows any tolerance variation of the new end rib compared to the replaced end rib to be accommodated for.

It will be clear to the skilled person that the examples described above may be adjusted in various ways. For example, the reinforcement element 35 is shown to be attached to the end rib 25. In alternative examples, the reinforcement may extend between the cover end region 32 and the spar end region 34 to couple the spar end region 34 with the cover end region 32 but not be attached directly to the end rib 25.

In alternative examples, the integrated Z-shaped spar-cover 11 may include a lower cover and a trailing edge spar, or a lower cover and a leading edge spar, or an upper cover and a trailing edge spar. Similarly, the omega-shaped spar-cover may include a lower cover integrated with a leading edge spar and a trailing edge spar, or one of the leading and trailing edge spars integrated with the upper and lower covers.

The spar-cover 11 is shown connecting to an end-rib 25. In alternative examples, the rib may be a mid-rib located at a mid-span location on the wing 3 inboard of the end-rib 25.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly comprising:
a longitudinal spar, and,
an aerofoil cover,
the spar and cover being integrally formed from a composite laminate material to form a spar-cover such that the composite material of the spar extends continuously into the cover through a fold region created between the spar and the cover,
the spar having a spar end region and the cover having a cover end region separated by a recess at a longitudinal end of the fold region that is a cutaway providing a discontinuity in a shear continuity between the spar and the cover,
wherein the composite material provides a shear continuity between the spar and the cover away from the spar end region and the cover end region,
wherein a reinforcement element extends between the spar end region and the cover end region to couple the spar end region with the cover end region, so as to provide a shear continuity between the spar end region and the cover end region,
a rib at an outboard end of the aerofoil body, the rib extending between the cover end region of the upper cover and the lower cover, and
an attachment portion extending between the rib and the recess.

2. The aircraft assembly of claim 1, wherein the cover end region is held in a deflected position to fix the structural member between the cover end region of the upper cover and the lower cover.

3. The aircraft assembly of claim 1, wherein the aircraft assembly is a wing assembly and the structural member is arranged to mount a winglet.

4. The aircraft assembly of claim 1, wherein the spar-cover has a first limb corresponding to the upper cover, a second limb corresponding to a spar web, and a third limb corresponding to a spar flange for attachment to the lower cover.

5. The aircraft assembly of claim 1, wherein the reinforcement element abuts the structural member.

6. The aircraft assembly of claim 1, wherein the fold region has a curved fold axis extending substantially in the longitudinal direction of the spar, and the recess extends in the direction of the curved fold axis.

7. The aircraft assembly of claim 1, wherein the reinforcement element holds at least one of the spar end region and the cover end region in a deflected position.

8. The aircraft assembly of claim 1, wherein the reinforcement element overlaps a juncture between the longitudinal end of the fold region and the recess.

9. The aircraft assembly of claim 8, wherein the juncture is arcuate.

10. The aircraft assembly of claim 1, wherein the reinforcement element comprises a metal.

11. The aircraft assembly of claim 1, wherein the spar is a first spar and the body comprises a second spar, the second spar and cover being integrally formed from a composite laminate material such that the composite material of the second spar extends continuously into the cover through a second fold region created between the second spar and the cover, wherein a second spar end region of the second spar and a cover end region of the cover are separated by a second recess at a longitudinal end of the second fold region, and wherein a second reinforcement element extends between the second spar end region and the cover end region to couple the second spar end region with the cover end region.

12. An aircraft comprising the aircraft assembly of claim 1.

13. An aerofoil shaped body comprising:
a first aerofoil cover; and
an integrally formed spar-cover formed from a composite laminate material having a longitudinal spar, a second aerofoil cover, and a fold region created between the spar and the second aerofoil cover to extend continuously between the spar and the second aerofoil cover;
wherein a portion of the second aerofoil cover at one end of the spar-cover is separated and decoupled from the spar and is in at least one of a deflected position towards and a deflected position away from the first aerofoil cover with respect to the remainder of the second aerofoil cover providing a discontinuity in a shear continuity between the spar and the second aerofoil cover, wherein the composite material provides a shear continuity between the spar and the second aerofoil cover away from the one end of the second aerofoil cover;
the aerofoil shaped body further comprising a bridging member between the portion of the second aerofoil cover and the spar arranged to hold the portion of the second aerofoil cover in the deflected position,
a rib at an outboard end of the aerofoil body, the rib extending between the cover end region of the upper cover and the lower cover, and
an attachment portion extending between the rib and the recess.

14. A method of assembling an aircraft assembly,
the aircraft assembly comprising:
a structural member, a longitudinal spar, and an aerofoil cover,
the spar and cover being integrally formed from a composite laminate material to form a spar-cover such that the composite material of the spar extends continuously into the cover through a fold region created between the spar and the cover,
the method comprising:
cutting away a recess in the fold region to separate the spar and cover at a longitudinal end of the integrally formed spar-cover providing a discontinuity in a shear continuity between the spar and the cover, wherein the composite material provides a shear continuity between the spar and the cover away from the spar end region and the cover end region,
attaching the spar end region to the structural member,
attaching the cover end region to the structural member,
coupling the cover end region to the spar end region with a reinforcement element, so as to provide a shear continuity between the spar end region and the cover end region, and
providing a rib at an outboard end of the aerofoil body, the rib extending between the cover end region of the upper cover and the lower cover, and
an attachment portion extending between the rib and the recess.

15. The method of claim 14, comprising the steps of:
aligning the spar end region with a lower end of the structural member, bending the cover end region to align with an upper end of the structural member.

* * * * *